(12) United States Patent
Kim et al.

(10) Patent No.: US 12,425,524 B2
(45) Date of Patent: Sep. 23, 2025

(54) GENERATING FILE OF DISTINCT WRITER BASED ON HANDWRITING TEXT

(71) Applicant: Hewlett-Packard Development Company, L.P., Spring, TX (US)

(72) Inventors: Yuna Kim, Seongnam Si (KR); Haekee Lee, Seongnam Si (KR)

(73) Assignee: Hewlett-Packard Development Company, L.P., Spring, TX (US)

( * ) Notice: Subject to any disclaimer, the term of this patent is extended or adjusted under 35 U.S.C. 154(b) by 132 days.

(21) Appl. No.: 18/567,996

(22) PCT Filed: Dec. 1, 2021

(86) PCT No.: PCT/US2021/061362
§ 371 (c)(1),
(2) Date: Dec. 7, 2023

(87) PCT Pub. No.: WO2022/265666
PCT Pub. Date: Dec. 22, 2022

(65) Prior Publication Data
US 2024/0244149 A1 Jul. 18, 2024

(30) Foreign Application Priority Data
Jun. 18, 2021 (JP) .......................... 10-2021-0079396

(51) Int. Cl.
| | |
|---|---|
| *H04N 1/04* | (2006.01) |
| *G06V 30/18* | (2022.01) |
| *G06V 30/30* | (2022.01) |
| *G06V 30/413* | (2022.01) |
| *G06V 40/30* | (2022.01) |

(Continued)

(52) U.S. Cl.
CPC ....... *H04N 1/0097* (2013.01); *G06V 30/1801* (2022.01); *G06V 30/30* (2022.01); *G06V 30/413* (2022.01); *G06V 40/33* (2022.01); *H04N 1/2338* (2013.01)

(58) Field of Classification Search
USPC ....................................... 358/1.15
See application file for complete search history.

(56) References Cited

U.S. PATENT DOCUMENTS

| | | |
|---|---|---|
| 6,741,737 B1 | 5/2004 | Lenoir |
| 2005/0248808 A1 | 11/2005 | Ma et al. |

(Continued)

FOREIGN PATENT DOCUMENTS

| | | |
|---|---|---|
| CN | 106529490 A | 3/2017 |
| JP | 2001-320571 A | 11/2001 |

(Continued)

*Primary Examiner* — Cheukfan Lee
(74) *Attorney, Agent, or Firm* — Brooks, Cameron & Huebsch, PLLC

(57) ABSTRACT

An example electronic apparatus includes a user interface device, a communication device, a processor, and a memory to store instructions executable by the processor. The processor is to execute the instructions to obtain an image regarding a document including handwritten text, distinguish a writer who writes the handwritten text based on feature information of the handwritten text that is read from the image, and generate a file regarding the document based on at least one of setting information of the writer or setting information of the handwritten text.

15 Claims, 17 Drawing Sheets

(51) Int. Cl.
*H04N 1/00* (2006.01)
*H04N 1/23* (2006.01)

(56) References Cited

U.S. PATENT DOCUMENTS

| | | |
|---|---|---|
| 2007/0188793 A1 | 8/2007 | Wakai |
| 2008/0144131 A1 | 6/2008 | Jung et al. |
| 2015/0356761 A1 | 12/2015 | Saitoh et al. |
| 2018/0330155 A1 | 11/2018 | Hiratsuka |
| 2024/0244149 A1* | 7/2024 | Kim ..................... G06V 30/413 |

FOREIGN PATENT DOCUMENTS

| | | |
|---|---|---|
| JP | 2007-034924 A | 2/2007 |
| KR | 10-2008-0068776 A | 7/2008 |

\* cited by examiner

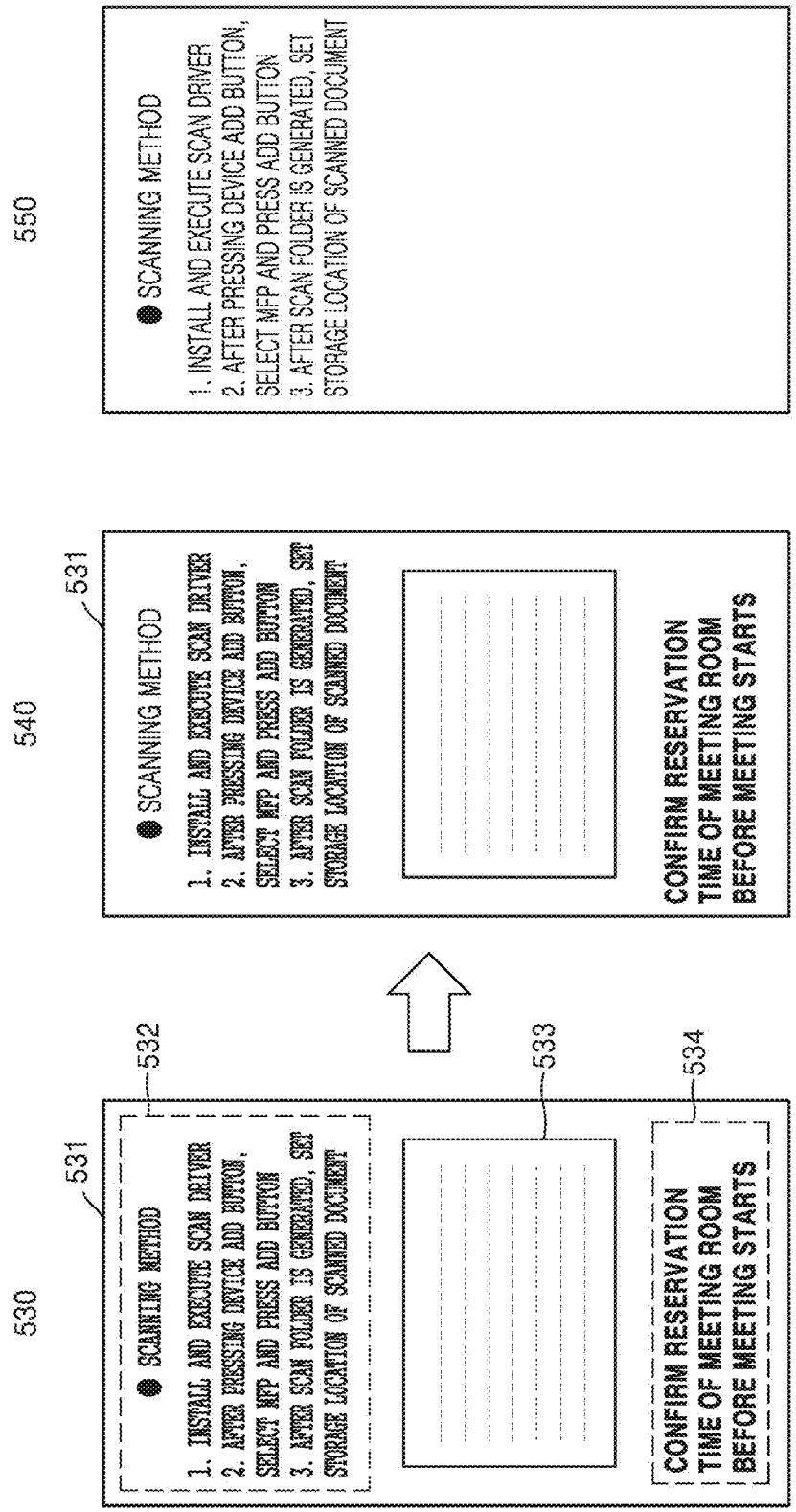

FIG. 9A

| IDENTIFIED WRITER | DESTINATION |
|---|---|
| FIRST WRITER | ● MAIL OF FIRST WRITER<br>○ SHARE POINT OF FIRST WRITER |
| SECOND WRITER | ● FOLDER OF SECOND WRITER<br>○ MAIL OF SECOND WRITER |
| THIRD WRITER | ● SHARE POINT OF THIRD WRITER<br>○ FTP OF THIRD WRITER |

○ AUTOMATIC TRANSMISSION

910 — IDENTIFIED WRITER
920 — DESTINATION

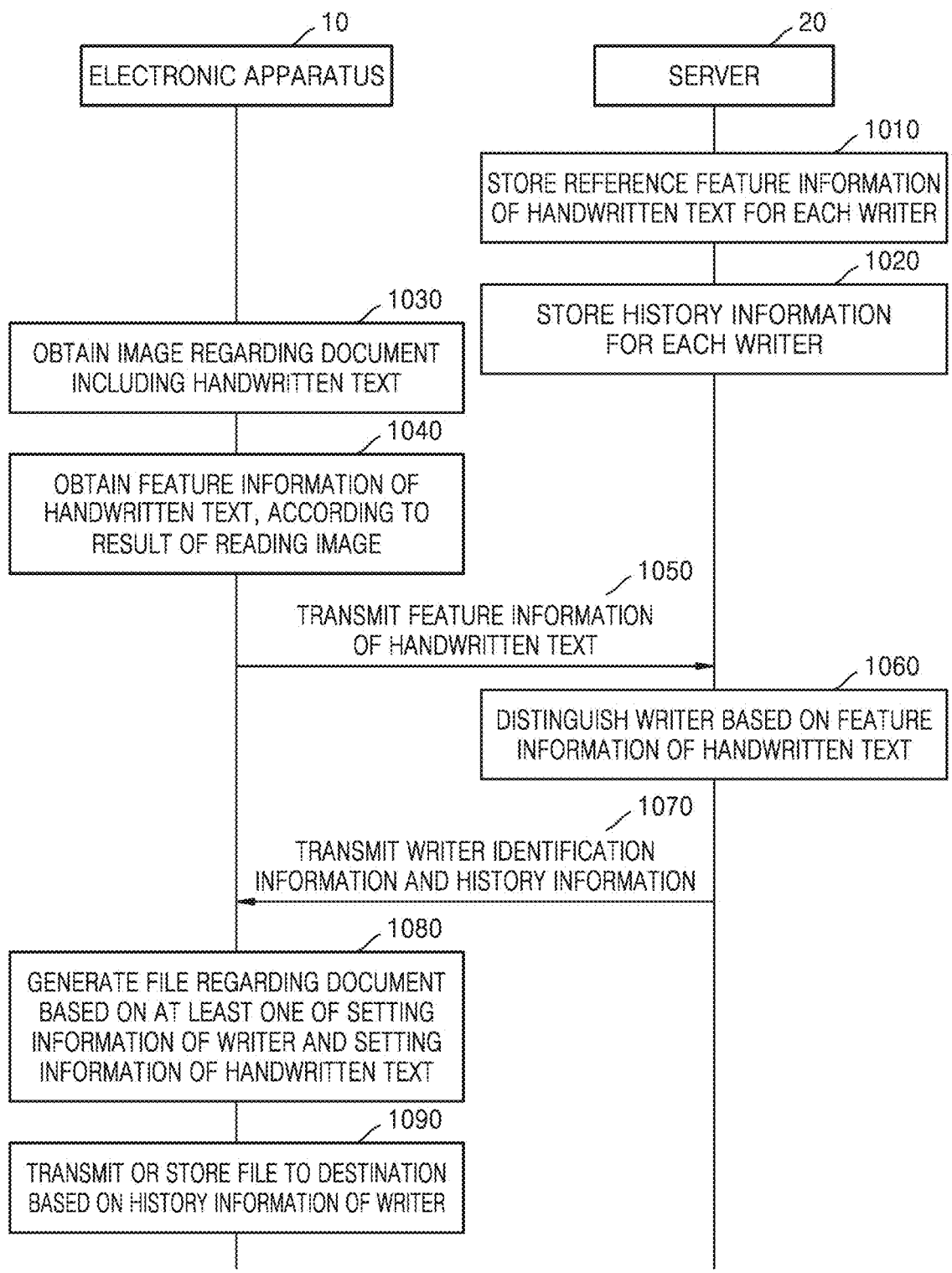

GENERATING FILE OF DISTINCT WRITER BASED ON HANDWRITING TEXT

BACKGROUND

An image forming apparatus may receive setting information regarding a storage format of a scanned document, a file name for the scanned document, a destination to which the scanned document is to be transmitted, etc. In a case where a scan job command for a certain document is received by the image forming apparatus, the image forming apparatus may perform a scan job on the certain document, based on setting information. For example, the image forming apparatus may generate a file regarding the scanned document according to a storage format and a file name and transmit the generated file to a destination that is set.

BRIEF DESCRIPTION OF THE DRAWINGS

Various examples will be described below by referring to the following figures.

FIGS. 5B and 5C are diagrams for explaining a process of generating a file, from which handwritten text of a selected writer is searchable, based on a storage type of the file according to an example.

FIG. 9A is a diagram for explaining a process in which an electronic apparatus sets a destination to which a generated file is to be transmitted according to an example.

FIG. 10 is a flowchart illustrating a method between an electronic apparatus and a server according to an example.

DETAILED DESCRIPTION

Figure 1:
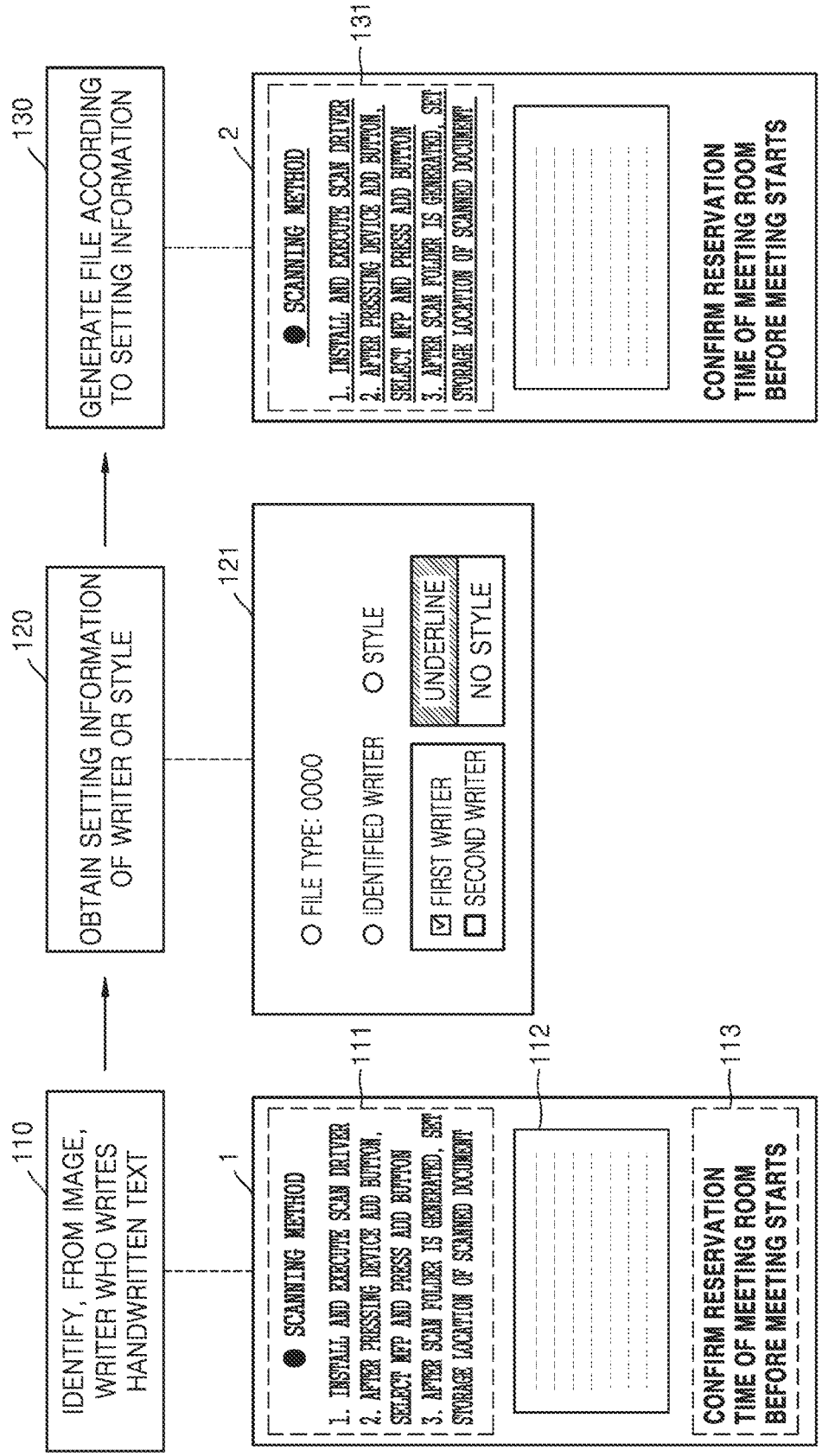
FIG. 1 is a conceptual view for explaining an operation in which an electronic apparatus generates a file regarding a document based on a result of identifying a writer who writes handwritten text in the document according to an example.

Hereinafter, examples will be described with reference to the accompanying drawings. However, other examples may be embodied in many different forms and should not be construed as being limited to the examples set forth herein.

The term "electronic apparatus" may refer to an apparatus to receive a users command and to display information processed according to the users command. An electronic apparatus may be, for example, an image forming apparatus, a Personal Computer (PC), a tablet PC, a Personal Digital Assistant (PDA), a laptop, a smartphone, a mobile phone, or the like. In the electronic apparatus, a program related to an operation of the electronic apparatus or an external apparatus may be installed. For example, a program for distinguishing a writer who writes handwritten text and for generating, storing, or transmitting a file regarding the distinguished writer may be installed in the electronic apparatus.

The term "image forming apparatus" may refer to any type of apparatus, for example, a printer, a copier, a scanner, a fax machine, a multi-function printer (MFP), or a display apparatus, which may perform an image forming job. Also, the image forming apparatus may be a two-dimensional (2D) image forming apparatus or a 3D image forming apparatus. An "image forming job performed by the image forming apparatus" may refer to a job associated with printing, copying, scanning, faxing, storage, transmission, coating, etc., and may be a combination of two or more of the above jobs. Also, a program related to a job performed in the image forming apparatus may be installed therein.

The term "handwritten text" may refer to text in a document that a certain writer writes in his/her handwriting.

The term "feature information" of the handwritten text may refer to information used to distinguish or identify the writer who writes the handwritten text and information including features of the handwritten text. For example, the feature information of the handwritten text may include parameters indicating the features of the handwritten text of each writer and parameter value information. For example, a parameter may be at least one of a height, a width, a gradient, a curve, or a stroke shape of the text.

The term "setting information" of the handwritten text may refer to a setting applied to the handwritten text during file generation. For example, the setting information of the handwritten text may include information used to set handwritten text to be stored during the file generation, style information of the handwritten text, etc. For example, a style of text may include a text highlight, a color of the text, an underline, a strike-through, no style, or the like.

The phrase "distinguishing a writer who writes handwritten text" may refer to classifying handwritten text according to feature information of the handwritten text and confirming that different writers write the classified handwritten text. For example, in a case where the handwritten text is classified into handwritten text having a first feature and handwritten text having a second feature, a writer that has written the handwritten text may be classified into a writer of the handwritten text having the first feature and a writer of the handwritten text having the second feature. Also, in a case where the handwritten text is classified as handwritten text having one feature, a writer of the handwritten text may be one.

Also, the phrase "distinguishing a writer who writes handwritten text" may refer to identifying a writer who writes the handwritten text. For example, based on a situation in which handwritten text of a first writer has a first feature and first handwritten text has the first feature, it may be identified that the first handwritten text is written by the first writer.

The term "setting information" of a writer may refer to information indicating a setting applied to a writer during file generation. For example, the setting information of the writer may include information used to set a writer of handwritten text to be stored during generation of a file name, information used to set a destination to which the generated file is to be transmitted and stored, or the like.

FIG. 1 is a conceptual view for explaining an operation in which an electronic apparatus generates a file regarding a document based on a result of identifying a writer who writes handwritten text in the document according to an example.

Referring to FIG. 1, an electronic apparatus (e.g., electronic apparatus 10 of FIG. 11) may identify, from an image, a writer who writes handwritten text in operation 110.

For example, the electronic apparatus 10 may obtain an image 1 of a scanned document. The electronic apparatus 10 may detect areas of handwritten text 111 and 113 and an area of printed text 112, based on a result of reading the image 1. The electronic apparatus 10 may obtain feature information of the handwritten text based on a writing style of the handwritten text. For example, in a case where the handwritten text 111 has different features from the handwritten text 113, the electronic apparatus 10 may distinguish that writers of the handwritten text 111 and 113 are different.

For example, the electronic apparatus 10 may identify a writer of handwritten text based on a result of comparing feature information of the handwritten text with reference feature information of handwritten text of writers registered in advance. For example, a writer of the handwritten text 111 may be identified as a first writer, and a writer of the handwritten text 113 may be identified as a second writer.

In operation 120, the electronic apparatus 10 may obtain writer or style setting information. For example, in operation 121, the electronic apparatus 10 may receive an input of selecting a first user from among identified writers and an input of setting style information of the handwritten text 111 written by the first writer so as to generate a file regarding the first writer in the image 1. For example, the style information of the handwritten text 111 may indicate a style of underlining the handwritten text 111.

In operation 130, the electronic apparatus 10 may generate a file according to a writer or style setting information. For example, in an image 2, an underline may be added to the handwritten text 131 written by the first user.

Figure 2:
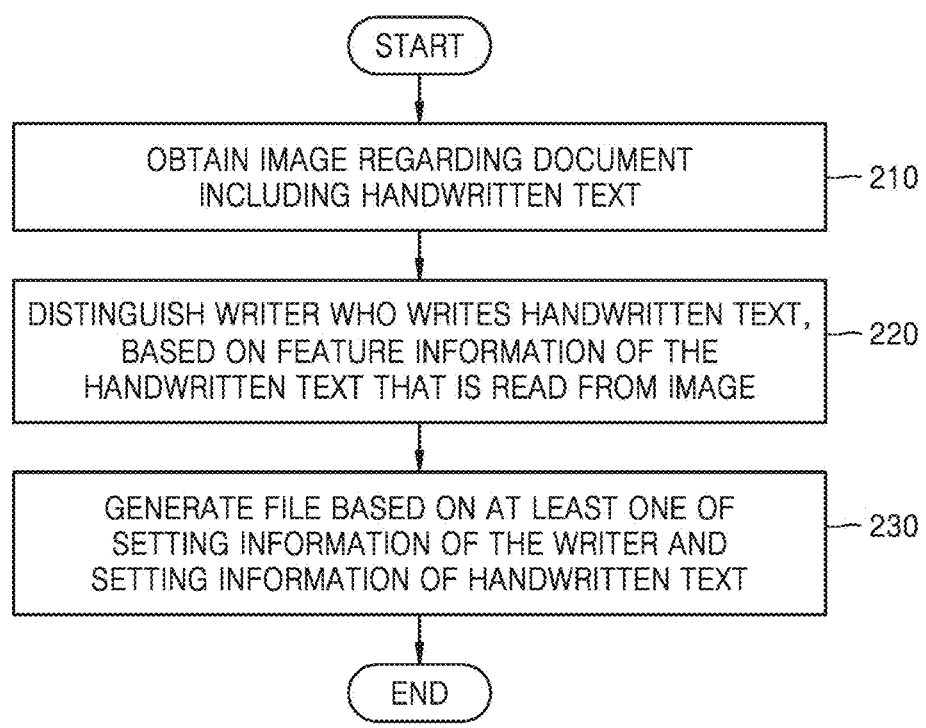
FIG. 2 is a flowchart illustrating a method of an electronic apparatus according to an example.

FIG. 2 is a flowchart illustrating an operation method of an electronic apparatus according to an example.

Referring to FIG. 2, the electronic apparatus 10 may obtain an image regarding a document including handwritten text in operation 210. For example, the electronic apparatus 10 may receive an image from an external apparatus. Also, the electronic apparatus 10 may photograph the document including the handwritten text by using a camera in the electronic apparatus 10, thus obtaining an image.

For example, in a case where the electronic apparatus 10 is an image forming apparatus, the image forming apparatus obtain an image by using a scanner, based on a job of scanning the document including the handwritten text.

In operation 220, the electronic apparatus 10 may distinguish a writer who writes the handwritten text, based on feature information of the handwritten text read from the image.

For example, the electronic apparatus 10 may use an Optical Character Reader (OCR) or an Intelligent Character Reader (ICR) to detect and recognize an area of the handwritten text and an area of printed text that are included in the image.

For example, the electronic apparatus 10 may obtain feature information of the handwritten text, based on at least one of a height, a width, a gradient, a curve, or a stroke shape of the handwritten text.

For example, the electronic apparatus 10 may distinguish the writer of the handwritten text according to a result of comparing the feature information of the handwritten text with reference feature information of the handwritten text. For example, in a case where the feature information of the handwritten text matches at least two pieces of the reference feature information of the handwritten text, the electronic apparatus 10 may distinguish that the handwritten text is written by at least two writers.

For example, in a case where the reference feature information of the handwritten text is mapped to the writer and stored, the electronic apparatus 10 may identify the writer of the handwritten text according to the result of comparing the feature information of the handwritten text with the reference feature information of the handwritten text. An example process of identifying a writer of handwritten text is described with reference to FIG. 3.

For example, the electronic apparatus 10 may transmit the feature information of the handwritten text to a server 20. The electronic apparatus 10 may receive, from the server 20, information regarding the writer of the handwritten text that is identified based on the feature information of the handwritten text.

In a case where the feature information of the handwritten text does not match the reference feature information of the handwritten text, the electronic apparatus 10 may map the feature information of the handwritten text to information of the writer that is input by a user, and may register mapping information to a database as a new writer.

In operation 230, the electronic apparatus 10 may generate a file regarding the document, based on at least one of setting information of the writer or setting information of the handwritten text.

For example, the electronic apparatus 10 may obtain an area of the handwritten text based on the result of reading the image. The electronic apparatus 10 may generate a first file from which the handwritten text may be retrieved, based on the area of the handwritten text and a storage type of the file. Therefore, because the handwritten text of a certain writer is allowed to be retrieved, it is possible to prevent information unnecessary to the user from being retrieved or stored. An example process of generating a file, from which the handwritten text of the certain writer may be retrieved, is described with reference to FIGS. 5A to 5C.

For example, the electronic apparatus 10 may receive an input of setting style information applied to the handwritten text. Based on the style information, the electronic apparatus 10 may generate a second file including handwritten text having a changed style. In a case where there are multiple writers, styles of the handwritten text may be differently applied depending on each writer. As a certain style is applied to the handwritten text of the writer, discrimination and readability of the text may be improved. An example process in which the handwritten text of the specific writer is changed according to the style information is described with reference to FIGS. 6A and 6B.

For example, the electronic apparatus 10 may obtain security level information of the identified writer. Based on the security level information of the writer, the electronic apparatus 10 may generate a third file by performing security processing on information requiring security in the document, according to a preset method. Therefore, as the information is managed according to a security level of the writer, the information in the document that requires security may be protected. An example process of generating a file according to the security level information of the writer is described with reference to FIG. 7.

For example, in a case where the identified writer matches a user logging in to the electronic apparatus 10, the electronic apparatus 10 may allow a certain job on the document including the handwritten text. On the contrary, in a case where the identified writer does not match the user logging in to the electronic apparatus 10, the electronic apparatus 10 may allow a preset job on the document including the handwritten text. Also, in a case where the identified writer does not match the user logging in to the electronic apparatus 10, the electronic apparatus 10 may allow a preset job based on whether the information requiring the security is included in the document including the handwritten text. In this case, the electronic apparatus 10 may identify whether the user logging in to the electronic apparatus 10 is a user authorized for the preset job and allow the preset job.

For example, the electronic apparatus 10 may generate a file under the file name that distinguishes the writer, based on the setting information of the writer.

For example, in a situation in which the writers are distinguished from the image, the electronic apparatus 10 may classify the document as a personal document of a writer selected from among the writers, based on the area of the handwritten text of the selected writer. The electronic apparatus 10 may generate a personal file under the file name used to distinguish the selected writer, based on a classification result. An example process of generating a personal file for each writer is described with reference to FIGS. 8A and 8B.

For example, the electronic apparatus 10 may detect a destination, to which the file is to be transmitted or stored, based on history information of the writer. The electronic apparatus 10 may transmit or store the file to the determined destination. Because the destination is determined based on the history information of the writer, the convenience may be provided to the user. An example process of transmitting or storing the file to the determined destination is described with reference to FIGS. 9A and 9B.

For example, the electronic apparatus 10 may obtain and display information regarding an address book of the writer. For example, the information regarding the address book may include at least one of a phone number, an email, an SNS address, a fax number, etc. of a registered user. The electronic apparatus 10 may receive an input of selecting, from the information regarding the address book, the destination to which the file is to be transmitted or stored. The electronic apparatus 10 may transmit or store the file to the determined destination.

Figure 3:
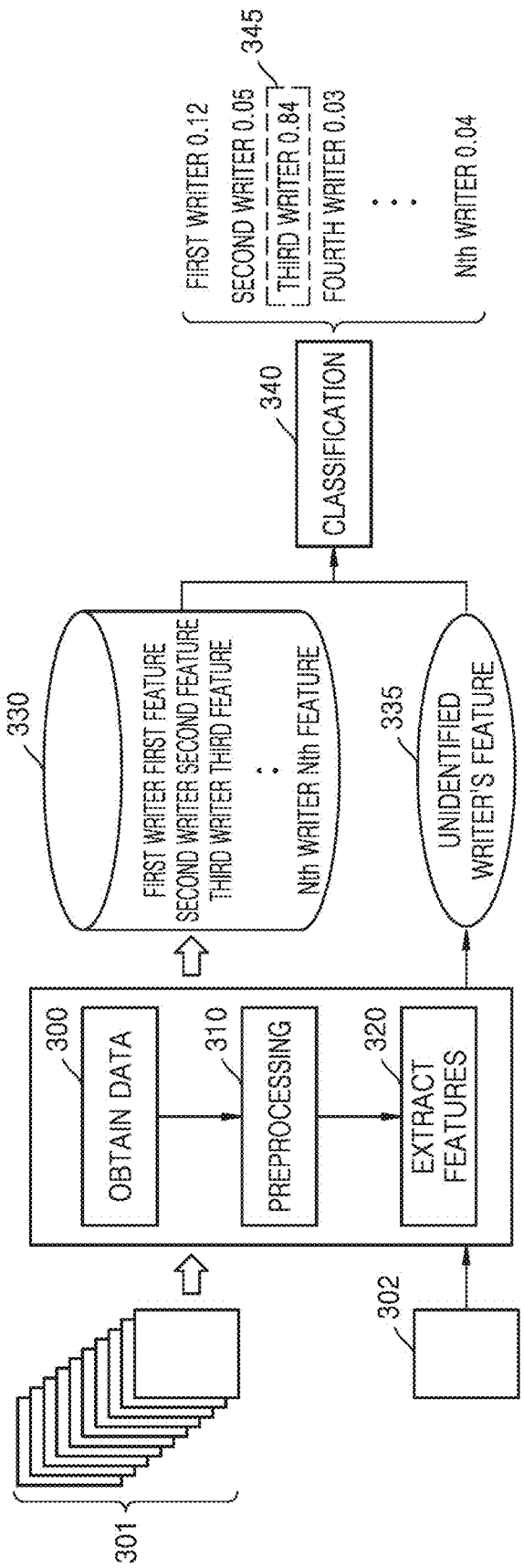
FIG. 3 is a diagram for explaining a process of identifying a writer who writes handwritten text in a document according to an example.

FIG. 3 is a diagram for explaining a process of identifying a writer who writes handwritten text in a document according to an example.

An example process of identifying a writer based on feature information of handwritten text may be performed by the electronic apparatus 10 or the server 20. For convenience, FIG. 3 illustrates an example performed by the electronic apparatus 10.

Referring to FIG. 3, to distinguish the writer writing the handwritten text in the document, the electronic apparatus 10 may map the feature information of the handwritten text to each writer and store the same in advance, according to operations 300 to 330.

For example, in operation 300, the electronic apparatus 10 may obtain images 301 of the scanned document including the handwritten text for each writer.

In operation 310, the electronic apparatus 10 may perform preprocessing on the images 301 to accurately identify the writers. For example, preprocessing may include binarization, normalization, noise removal, segmentation, or the like, performed on an image. Based on removing unnecessary information from the images 301 on which the preprocessing is performed, the identifying of the writer may be made easier.

In operation 320, the electronic apparatus 10 may extract the feature information of the handwritten text written on each image 301, based on the images 301 on which the preprocessing is performed. For example, the feature information of the handwritten text may be information indicating at least one of a height, a width, a gradient, a curve, or a stroke shape of the handwritten text. Also, the feature information of the handwritten text may include information regarding a value of a parameter that indicates a feature of text. Also, the feature information of the handwritten text may be calculated based on values of parameters.

In operation 330, the electronic apparatus 10 may map the writer distinguished from each image 301 to the feature information of the handwritten text of the writer and may store the same. The electronic apparatus 10 may store, as reference feature information, the feature information of the handwritten text that becomes a reference to identify the writer.

In a case where an image regarding the document including the handwritten text is obtained from the electronic apparatus 10, the electronic apparatus 10 may perform a job of distinguishing the writer who writes the handwritten text in the document, according to operations 335 to 345.

For example, in operation 335, the electronic apparatus 10 may obtain the feature information of the handwritten text based on an image 302 obtained through a document scanning job.

In operation 340, the electronic apparatus 10 may detect reference feature information that is matched with the feature information of the handwritten text, according to a result of comparing the feature information of the handwritten text with the reference feature information of the handwritten text. For example, the electronic apparatus 10 may calculate a similarity between the feature information and the reference feature information of the handwritten text and detect reference feature information having the highest similarity. In operation 345, the electronic apparatus 10 may classify a writer, who is mapped to the reference feature information having the highest similarity from among the writers, as a writer of the handwritten text. For example, as the similarity is close to 1, the similarity between the feature information and the reference feature information of the handwritten text may be high. Referring to FIG. 3, the electronic apparatus 10 may classify, as the writer of the handwritten text, a third writer mapped to the reference feature information having the highest similarity (e.g., 0.84).

Also, in a case where the similarity between the feature information and the reference feature information of the handwritten text is less than a preset threshold value, the electronic apparatus 10 may detect that the writer of the handwritten text is not included in the registered writers and may register the writer of the handwritten text as a new writer.

The server 20 may perform operations 310 to 345 of the electronic apparatus 10 that are described with reference to FIG. 3. The server 20 may learn the images 301 through an Artificial Intelligence (AI) system and may extract the feature information of the handwritten text on the images 301, based on a learning result. For example, the AI system may be realized as at least one of a Deep Neural Network (DNN), a Convolutional Neural Network (CNN), a Recurrent Neural Network (RNN), a Region-based Convolutional Neural Network (R-CNN), an Extend Learning Model (ELM), a Deep Belief Network (DBN), or the like.

Also, the electronic apparatus 10 may transmit, to the server 20, the feature information of the handwritten text that is obtained from the image 302. The server 20 may detect the reference feature information, which is matched with the feature information of the handwritten text, according to the result of comparing the feature information of the handwritten text with the reference feature information of the handwritten text. The server 20 may classify the detected reference feature information as the writer of the handwritten text.

Figure 4:
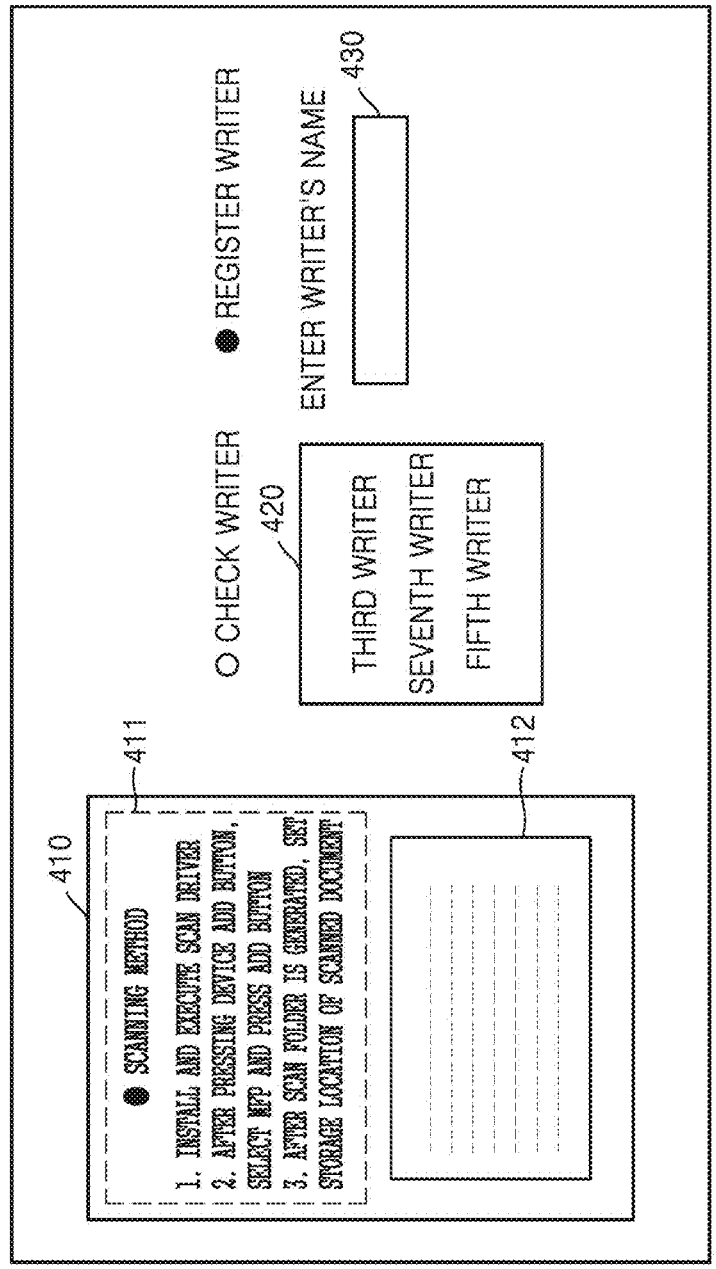
FIG. 4 is a diagram for explaining a process of registering a writer in an electronic apparatus to identify the writer who writes handwritten text in a document according to an example.

FIG. 4 is a diagram for explaining a process of registering a writer in an electronic apparatus to distinguish the writer who writes handwritten text in a document according to an example.

Referring to FIG. 4, the electronic apparatus 10 may obtain a first image 410 of a first scanned document. The first image 410 may include handwritten text 411 of a first writer and printed text 412. The electronic apparatus 10 may detect an area of the handwritten text 411 from the first image 410 and may obtain the feature information of the handwritten text 411.

The electronic apparatus 10 may detect a candidate writer who may be matched with the first writer and may display information 420 of the candidate writer. For example, the electronic apparatus 10 may detect the reference feature information of the handwritten text that has the highest similarity to the feature information of the handwritten text 411. The electronic apparatus 10 may detect, as the candidate writer, the writer who is mapped to the reference feature information of the handwritten text. For example, the similarity may be calculated based on a value of a parameter indicating a feature of the text. For example, the parameter indicating the feature of the text may indicate at least one of a height, a width, a gradient, a curve, or a stroke shape of the text. For example, the electronic apparatus 10 may display candidate writers in an order of highest similarity.

The user may identify the information 420 of the candidate writers and check whether the first writer of the handwritten text 411 of the first image 410 is included in the candidate writers. In a case where the first writer of the handwritten text 411 of the first image 410 is not included in the candidate writers, the user may register the first writer of the handwritten text 411 as a new writer. For example, the electronic apparatus 10 may display a user interface 430 to receive a name of the writer. The electronic apparatus 10 may receive a name of the first writer of the handwritten text 411 through the user interface 430. The electronic apparatus 10 may map the feature information of the handwritten text 411 to the first writer and may store the same.

Figure 5A:
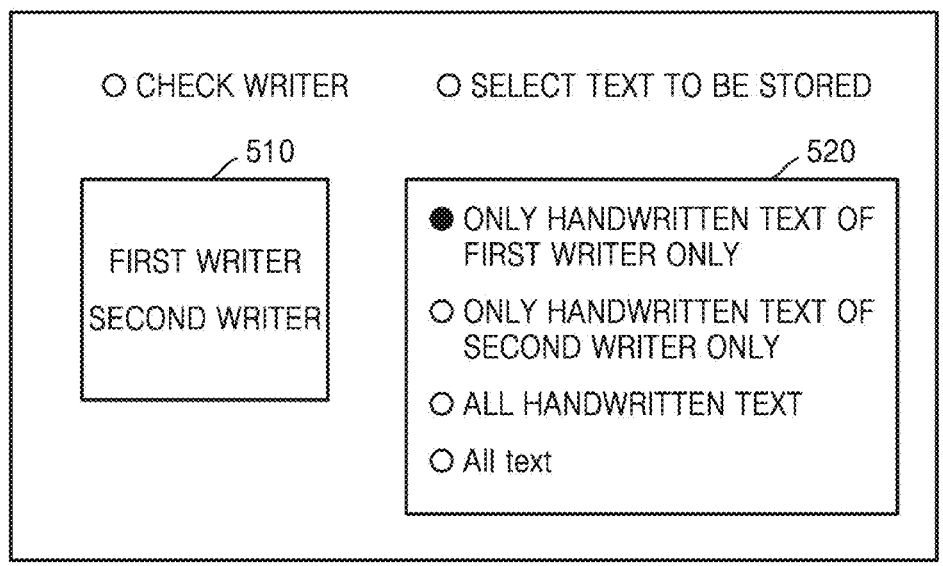
FIG. 5A is a diagram for explaining a process in which an electronic apparatus selects text to be stored, based on an identified writer according to an example.

FIG. 5A is a diagram for explaining a process in which an electronic apparatus selects text to be stored, based on an identified writer according to an example.

Referring to FIG. 5A, the electronic apparatus 10 may display a user interface 520 for selecting text to be stored, based on information 510 of the writer identified in the document and the writer.

For example, the electronic apparatus 10 may identify the writers of the handwritten text as the first writer and a second writer as a result of reading an image of a scanned document. The electronic apparatus 10 may display the information 510 of the writer that indicates the first writer and a second writer.

For example, the user interface 520 may provide an icon used to select handwritten text to be stored during the file generation. As illustrated in FIG. 5A, the user interface 520 may provide an icon used to select the handwritten text of the first writer, the handwritten text of the second writer, handwritten text of all writers, and all text in the document. For example, the electronic apparatus 10 may receive, through the user interface 520, an input of selecting the handwritten text of the first writer.

The electronic apparatus 10 may receive information, which is used to set a storage type of a file, to generate a file regarding the document. For example, the storage type of the file may indicate a file format for storing text or images. For example, the storage type of the file may include PDF, DOCX, RTF, TXT, etc. For example, the electronic apparatus 10 may generate a file, from which the handwritten text may be retrieved, according to the area of the handwritten text and the storage type of the file.

Figure 5C:
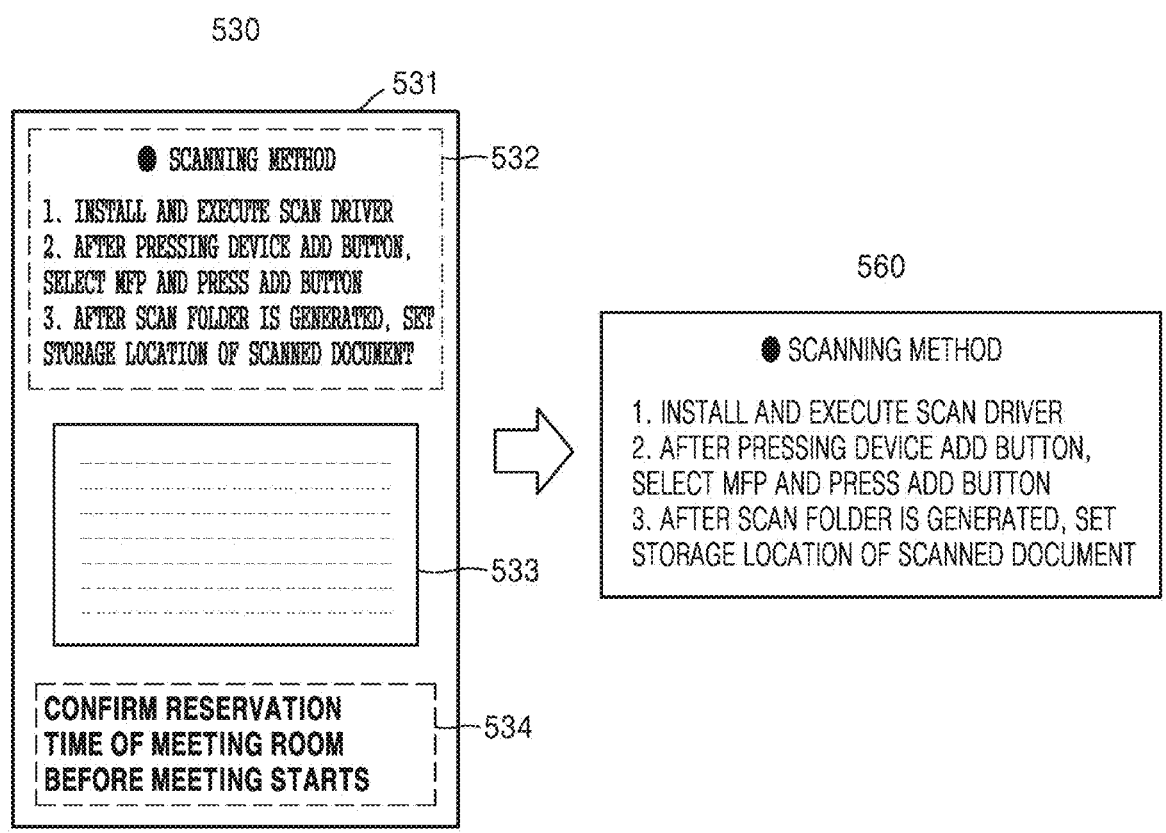

FIGS. 5B and 5C are diagrams for explaining a process of generating a file, from which handwritten text of a selected writer is searchable, based on a storage type of the file according to an example.

FIG. 5B illustrates a process of generating a first file from which handwritten text of a selected writer may be retrieved in a case where a storage type of the file is a PDF according to an example.

Referring to an image 530 of FIG. 5B, the electronic apparatus 10 may obtain a first image 531 based on a scan of the first document. The first image 531 may include handwritten text 532 of the first writer, printed text 533, and handwritten text 534 of the second writer. The electronic apparatus 10 may detect areas of the handwritten text 532 and 534 and an area of the printed text 533, according to a result of reading the first image 531.

The electronic apparatus 10 may obtain feature information of the handwritten text 532 and 534 based on at least one of a height, a width, a gradient, a curve, or a stroke shape of the text that is written in the areas of the handwritten text 532 and 534.

The electronic apparatus 10 may identify a writer of each of the handwritten text 532 and 534, based on a result of comparing the feature information of the handwritten text 532 and 534 with reference feature information of handwritten text of the writers. For example, the electronic apparatus 10 may identify the writer of the handwritten text 532 as the first writer and the writer of the handwritten text 534 as the second writer.

For example, the electronic apparatus 10 may receive an input of selecting the storage type of the file as a PDF. Also, the electronic apparatus 10 may receive an input of setting the area of the handwritten text 532 of the first writer as a storage area during the file generation. As illustrated in an image 550 of FIG. 5B, the electronic apparatus 10 may store, in a text layer, a recognition result of the handwritten text 532 to enable the handwritten text 532 of the first writer to be retrieved. Also, the electronic apparatus 10 may not store the printed text 533 or the handwritten text 534 of the second writer in the text layer, and as illustrated in an image 540 of FIG. 5B, the electronic apparatus 10 may process the printed text 533 and the handwritten text 534 as image layers of the first image 531. Therefore, the electronic apparatus 10 may generate the first file in a PDF form in which the handwritten text 532 of the first writer is searchable. In the first file, the printed text 533 and the handwritten text 534 of the second writer may not be retrieved.

FIG. 5C illustrates a process of generating a second file, from which handwritten text of a selected writer may be retrieved, in a case where a storage type of the file is DOCX, RTF, or TXT according to an example.

Referring to an image 530 of FIG. 5C, as illustrated in FIG. 5B, the electronic apparatus 10 may detect the areas of the handwritten text 532 and 534 and the area of the printed text 533, according to the result of reading the first image 531 of the scanned first document. The electronic apparatus 10 may identify the writer of the handwritten text 532 as the first writer and the writer of the handwritten text 534 as the second writer.

For example, the electronic apparatus 10 may receive an input of selecting a storage type of the file regarding the document as one of DOCX, RTF, and TXT. Also, the electronic apparatus 10 may receive an input of setting the area of the handwritten text 532 of the first writer as a storage area during the file generation.

As illustrated in an image 560 of FIG. 5C, the electronic apparatus 10 may store the recognition result of the handwritten text 532 of the first writer according to the storage type of the selected file. Therefore, the electronic apparatus 10 may generate the second file in which the handwritten text 532 of the first writer is stored.

Figure 6A:
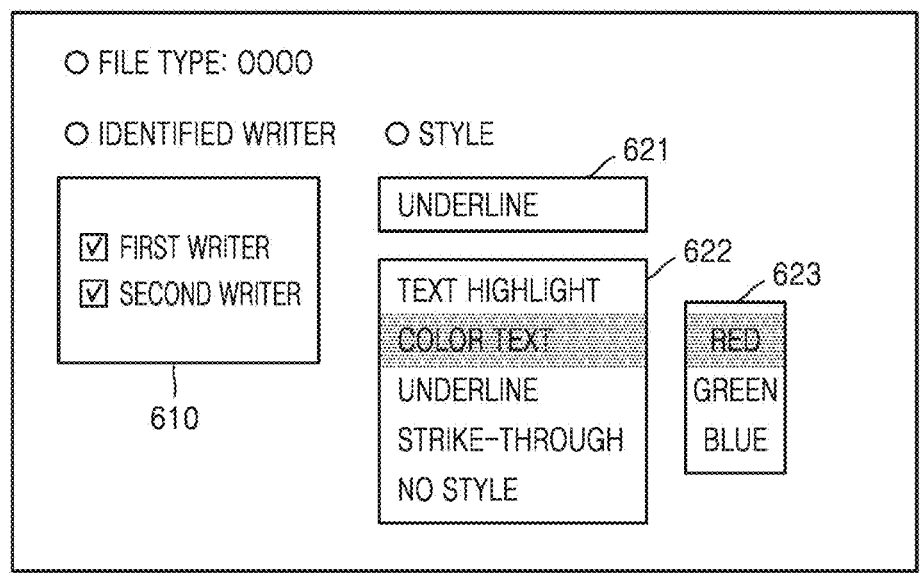
FIG. 6A is a diagram for explaining a process in which an electronic apparatus sets style information to be applied to handwritten text according to an example.

FIG. 6A is a diagram for explaining a process in which an electronic apparatus sets style information to be applied to handwritten text according to an example.

Referring to FIG. 6A, the electronic apparatus 10 may receive an input of setting style information to be applied to the handwritten text. For example, the electronic apparatus 10 may display information 610 of a writer who is identified as a writer of handwritten text, in an image of a scanned document. Also, the electronic apparatus 10 may display a user interface for setting style information for each handwritten text of the identified writer.

For example, the style information may be information indicating a style to be applied to the handwritten text. For example, the style may include a text highlight, a color of the text, an underline, a strike-through, no style, and the like. The electronic apparatus 10 may display a style list and receive an input of selecting a certain style from the style list.

In an example, the writers identified from the image of the scanned document may be the first writer and the second writer. The electronic apparatus 10 may receive information 621 of a first style to be applied to the handwritten text of the first writer. For example, the information 621 of the first style may be information indicating a style of underlining the handwritten text of the first writer.

Also, the electronic apparatus 10 may receive information 622 and 623 of a second style to be applied to handwritten text of the second writer. For example, the information 622 and 623 of the second style may be information indicating a style of applying a red color to the handwritten text of the second writer.

Figure 6B:
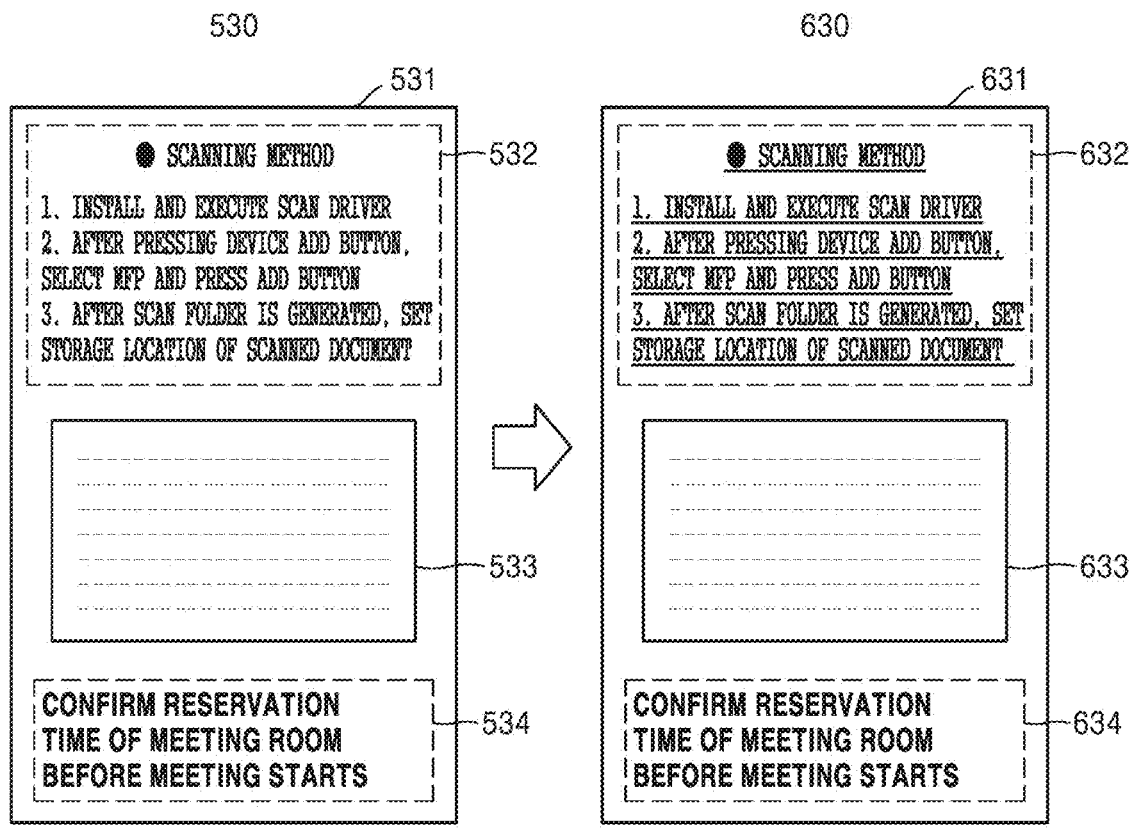
FIG. 6B is a diagram for explaining a process of generating a file including handwritten text having a changed style, based on style information according to an example.

FIG. 6B is a diagram for explaining a process of generating a file including handwritten text having a changed style, based on style information according to an example.

Referring to the image 530 of FIG. 6B, as illustrated in FIG. 5B, the electronic apparatus 10 may detect the areas of the handwritten text 532 and 534 and the area of the printed text 533, based on the result of reading the first image 531 of the scanned first document. The electronic apparatus 10 may identify the writer of the handwritten text 532 as the first writer and the writer of the handwritten text 534 as the second writer.

As illustrated in FIG. 6A, the electronic apparatus 10 may receive the information 621 of the first style of underlining the handwritten text of the first writer and the information 622 and 623 of the second style of applying the red color to the handwritten text of the second writer.

As illustrated in an image 630 of FIG. 6B, the electronic apparatus 10 may generate the second file, in which styles of the handwritten text 532 and 534 are changed, based on the information 621 of the first style and the information 622 and 623 of the second style. As a result of generating the second file, handwritten text 632 of the first writer may be underlined, handwritten text 634 of the second writer may be colored red, and a style of printed text 633 may be the same as before, in a document 631 regarding the second file.

Figure 7:
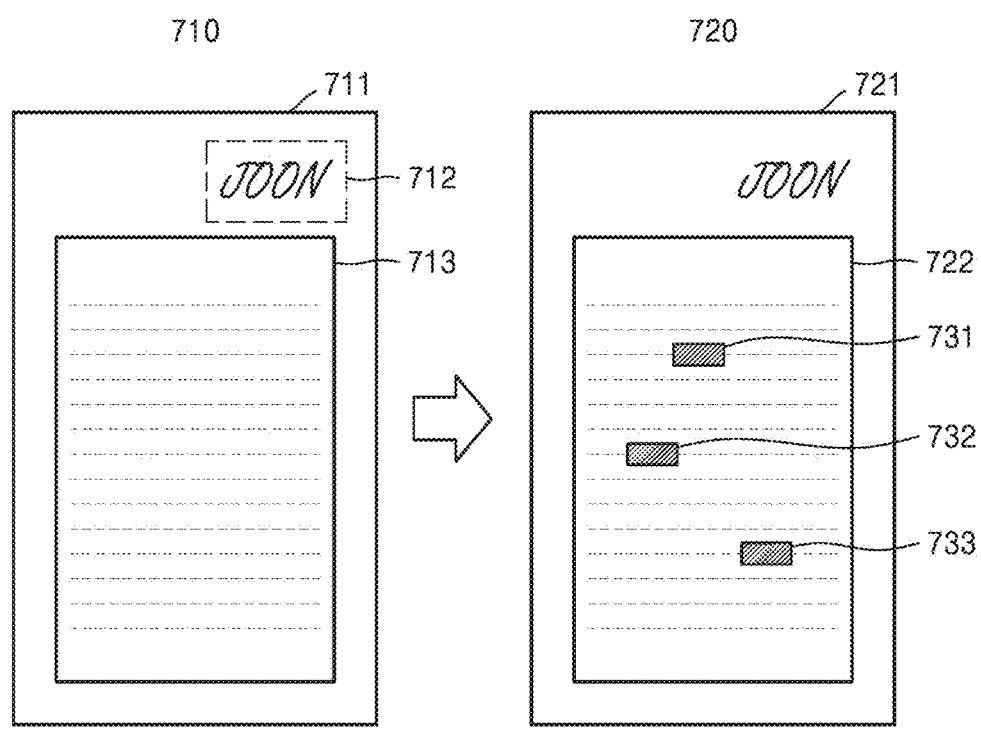
FIG. 7 is a diagram for explaining a process in which an electronic apparatus generates a file by performing security processing according to security level information of a writer who writes handwritten text in a document according to an example.

FIG. 7 is a diagram for explaining a process in which an electronic apparatus generates a file by performing security processing according to security level information of a writer who writes handwritten text in a document according to an example.

Referring to an image 710 of FIG. 7, the electronic apparatus 10 may detect an area of handwritten text 712 and an area of printed text 713, based on a result of reading a second image 711 of a scanned document. For example, the electronic apparatus 10 may identify a writer of the handwritten text 712 as the first writer. In a case where the handwritten text 712 is a signature, the electronic apparatus 10 may authenticate the writer based on the feature information of the handwritten text 712.

The electronic apparatus 10 may obtain security level information of the first writer. The security level information of the first writer may be stored in advance in the electronic apparatus 10, the server 20, etc. In a case where the security level information of the first writer is stored externally (e.g., in the server 20), the electronic apparatus 10 may transmit information of the first writer to the server 20 and may receive the security level information of the first writer therefrom. The security level information may be information indicating a security level that is set according to a writer. According to the security level, information provided to the writer may differ. For example, the security level may be classified into a high, a medium, or a low level, according to a degree of desired security. For example, a writer with a high-security level may access all information in the document, a writer with a medium security level may not access certain information in the document, and a writer with a low medium security level may not be allowed to access any information in the document.

For example, in a case where the security level of the first writer is set to be medium, the electronic apparatus 10 may generate the third file by performing security processing on information requiring security in the document according to a preset method, based on the security level information of the first writer. For example, the preset method may be a method of opaquely processing an area where the information requiring the security is displayed, a method of deleting the information requiring the security, or a method of forming a text layer to prevent the information requiring the security from being retrieved.

Referring to an image 720 of FIG. 7, the electronic apparatus 10 may detect the information requiring the security at a security level of the first writer and may perform image processing on areas 731, 732, and 733 to make them be opaque, wherein the information requiring the security is displayed in the areas 731, 732, and 733. That is, the information included in the areas 731, 732, and 733 may not be displayed in an area of text 722 of a document 721 regarding the third file on which the security processing is performed.

Figure 8A:
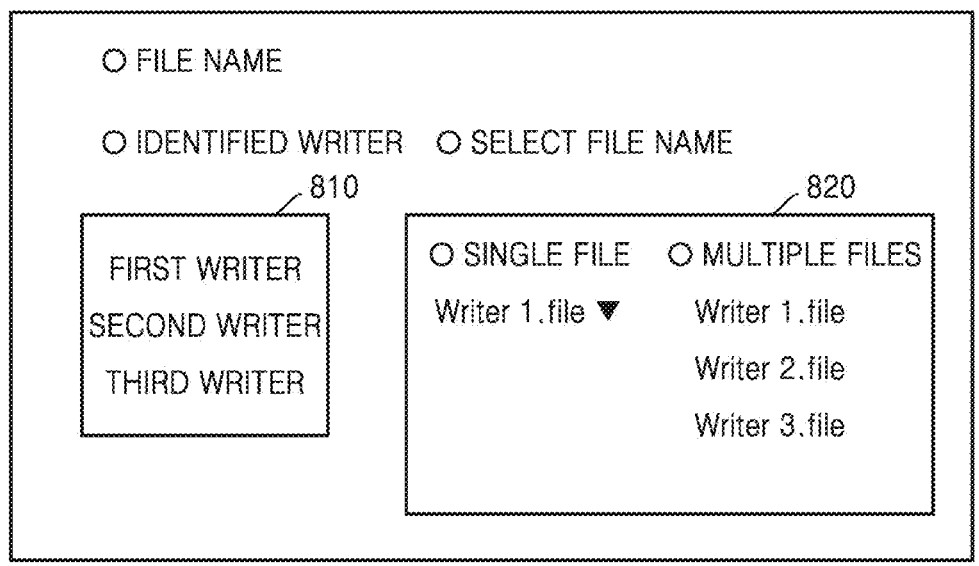
FIG. 8A is a diagram for explaining a process in which an electronic apparatus selects a file name based on an identified writer in a document according to an example.

FIG. 8A is a diagram for explaining a process in which an electronic apparatus selects a file name based on an identified writer in a document according to an example.

Referring to FIG. 8A, the electronic apparatus 10 may generate a file under a file name used to identify a writer, based on setting information of the writer. For example, the setting information of the writer may include information used to set at least one of a method of generating a file or a file name. For example, the method of generating the file may include a method of generating a document, in which handwritten text of the writers are identified, into one file and a method of generating a personal file for each writer. For example, the file name may be set as a title for identifying the writer.

For example, in a case where the writers are identified from the image, the electronic apparatus 10 may display information 810 of an identified writer, as illustrated in FIG. 8A. The electronic apparatus 10 may display a user interface 820 for setting whether to generate the file regarding the document as a single file or multiple files.

For example, in response to an input of selecting a single file, the electronic apparatus 10 may generate a single file under a name of a writer selected from among the first to third writers. Here, in the single file, handwritten text written by the first to third writers may be included.

For example, in response to an input of selecting multiple files, the electronic apparatus 10 may classify the document into documents respectively corresponding to the first to third writers and may generate files under the names of the writers. An example process of generating multiple files is described with reference to FIG. 8B.

Figure 8B:
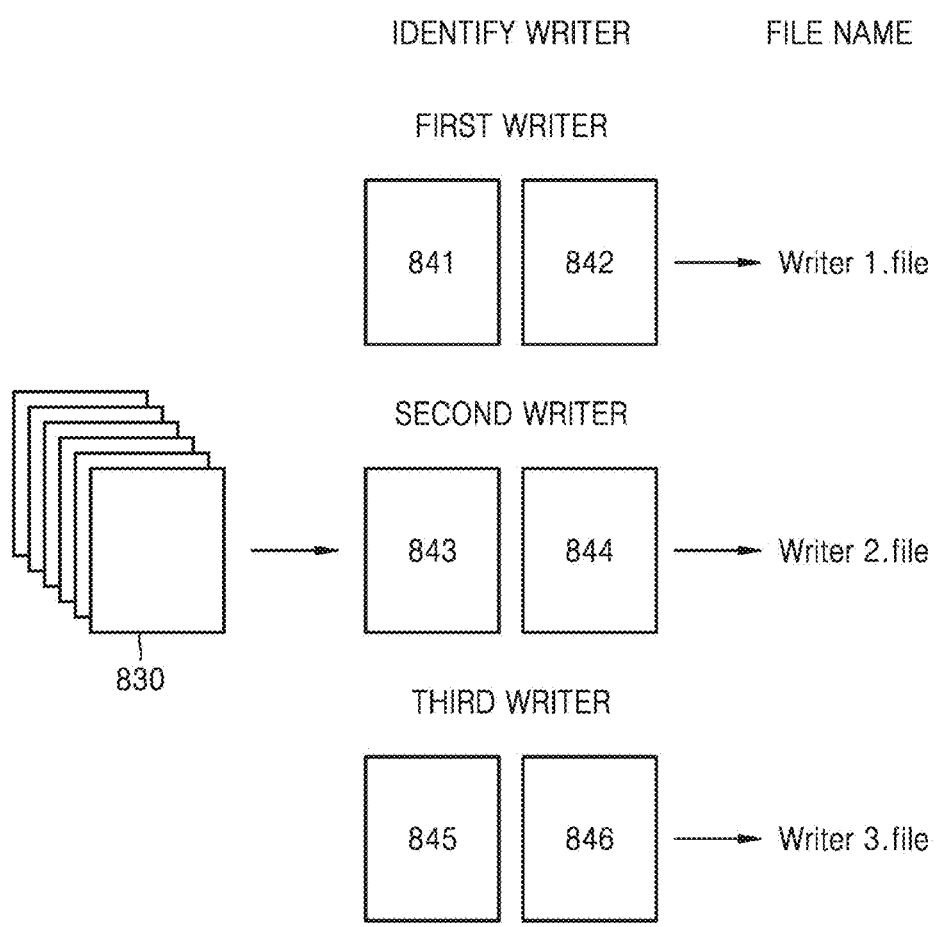
FIG. 8B is a diagram for explaining a process in which an electronic apparatus generates a personal file for each user according to an example.

FIG. 8B is a diagram for explaining a process in which an electronic apparatus generates a personal file for each user according to an example.

Referring to FIG. 8B, in a document 830, the handwritten text of the first to third writers may be included. For example, the handwritten text of the first writer may be included in a first page 841 and a second page 842 of the document, the handwritten text of the second writer may be included in a third page 843 and a fourth page 844, and the handwritten text of the third writer may be included in a fifth page 845 and a sixth page 846.

As illustrated in FIG. 8A, in response to an input of selecting multiple files, the electronic apparatus 10 may classify the first page 841 and the second page 842 as a document of the first writer, the third page 843 and the fourth page 844 as a document of the second writer, and the fifth page 845 and the sixth page 846 as a document of the third writer, according to a result of reading an image of the document 830.

The electronic apparatus 10 may generate a personal file of the writer based on the document classified for each writer. For example, the electronic apparatus 10 may generate a file name of the document of the first writer as Writer 1.file.

FIG. 9A is a diagram for explaining a process in which an electronic apparatus sets a destination to which a generated file is to be transmitted according to an example.

The electronic apparatus 10 may detect a destination, to which the file is to be transmitted or stored, based on history information of the writer. For example, the history information of the writer may include information indicating a history of transmitting or storing the file generated by the electronic apparatus 10. For example, the history information of the writer may include information regarding the destination, to which the file is to be transmitted or stored, and a medium used to transmit or store the file. Also, the history information of the writer may include a frequently-used destination or medium. The electronic apparatus 10 may transmit or store the file to the determined destination.

Referring to FIG. 9A, the electronic apparatus 10 may display information 920 regarding a destination for each of identified writers 910. For example, the information 920 regarding the destination may be displayed in an order of media that the writer frequently uses. The writer may identify the information 920 regarding the destination and may set a destination of a generated file. Also, the electronic apparatus 10 may automatically set the destination, to which the file is to be transmitted or stored, based on the history information of the writer.

For example, a destination of the first writer may be set as a mail of the first writer, a destination of the second writer may be set as a folder of the second writer, and a destination of the third writer may be set as a sharing point of the third writer.

Figure 9B:
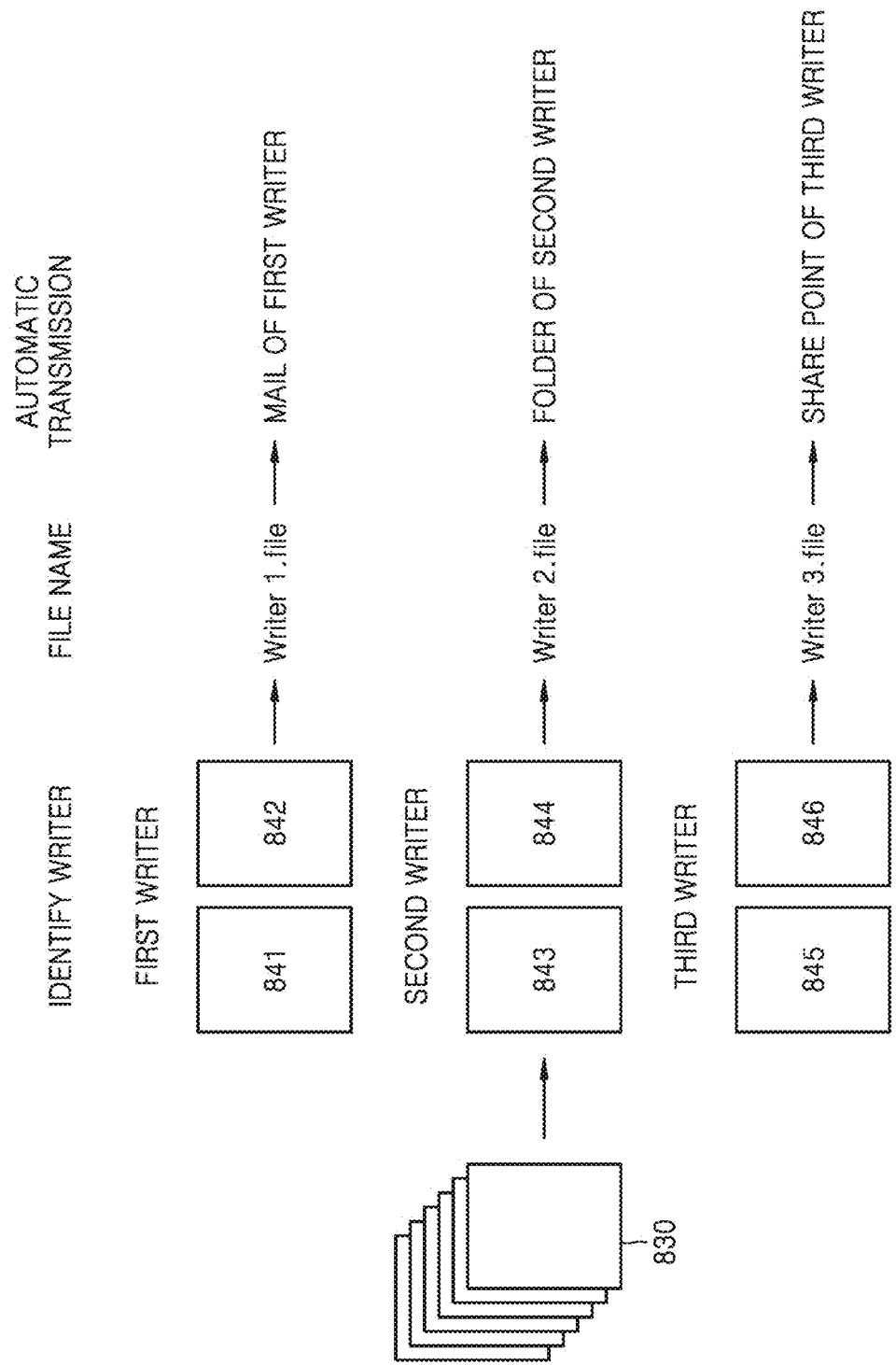
FIG. 9B is a diagram for explaining a process in which an electronic apparatus transmits a generated file according to an example.

FIG. 9B is a diagram for explaining a process in which an electronic apparatus transmits a generated file according to an example.

As described with reference to FIG. 9A, the electronic apparatus 10 may transmit a personal file to the destination determined for a personal file of each writer. Referring to FIG. 9B, the electronic apparatus 10 may transmit a personal file of the first writer to a mail address of the first writer, store a personal file of the second writer in the folder of the second writer, and store a personal file of the third writer as the sharing point of the third writer.

FIG. 10 is a flowchart illustrating a method between an electronic apparatus and a server according to an example.

Referring to FIG. 10, the server 20 may store reference feature information of handwritten text for each writer in operation 1010. In operation 1020, the server 20 may store history information of each writer.

In operation 1030, the electronic apparatus 10 may obtain an image regarding a document including the handwritten text. For example, the electronic apparatus 10 may receive an image from an external apparatus. Also, the electronic apparatus 10 may obtain an image by photographing a document including the handwritten text through a camera included in the electronic apparatus 10.

In operation 1040, the electronic apparatus 10 may obtain feature information of the handwritten text based on a result of reading the image. In operation 1050, the electronic apparatus 10 may transmit the feature information of the handwritten text to the server 20.

In operation 1060, the server 20 may distinguish the writers based on the feature information of the handwritten text. Also, the server 20 may identify a writer, who is mapped to the reference feature information matching the feature information of the handwritten text, as a writer of the handwritten text. In operation 1070, the server 20 may transmit, to the electronic apparatus 10, identification information and history information of the writer.

In operation 1080, the electronic apparatus 10 may generate a file regarding the document based on at least one of the setting information of the writer or the setting information of the handwritten text. In operation 1090, the electronic apparatus 10 may transmit or store the file to the destination based on the history information of the writer.

Figure 11:
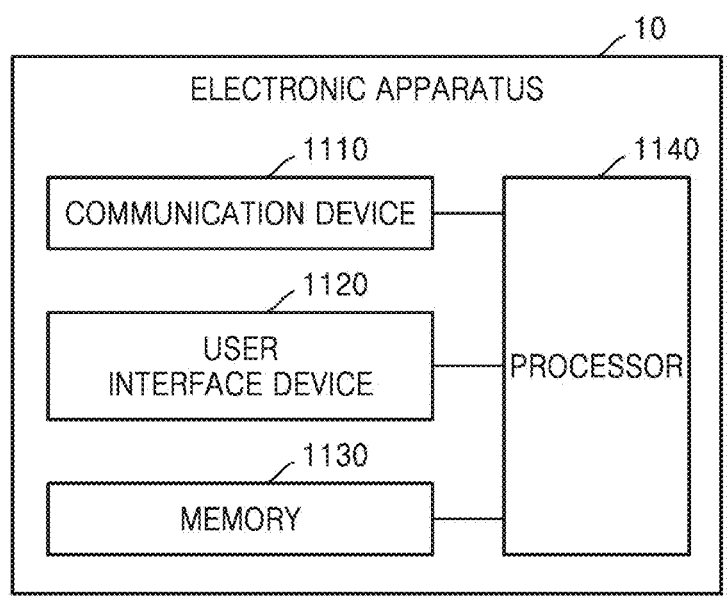
FIG. 11 is a block diagram of an electronic apparatus according to an example.

FIG. 11 is a block diagram of an electronic apparatus according to an example.

Referring to FIG. 11, the electronic apparatus 10 may include a communication device 1110, a user interface device 1120, a memory 1130, and a processor 1140. However, the electronic apparatus 10 may be realized by more or fewer components than the illustrated components. Hereinafter, examples of the components are described.

The communication device 1110 may communicate with an external apparatus. As an example, the communication device 1110 may be connected to a network in a wired or wireless manner and communicate with the external apparatus. Here, the external apparatus may be an electronic apparatus, the server 20, etc.

The communication device 1110 may include a communication module that supports one of various wired/wireless communication methods. For example, the communication module may be of a chipset type or may be a sticker/barcode (e.g., a sticker including a Near Field Communication (NFC) tag)) including information used for communication. Also, the communication module may be a short range communication module or a wired communication module.

For example, the communication device 1110 may support at least one of Wireless LAN, Wireless Fidelity (Wi-Fi), Wi-Fi Direct (WFD), Bluetooth, Bluetooth Low Energy (BLE), Wired Lan, NFC, Zigbee, infrared Data Association (IrDA), 3G, 4G, or 5G.

The user interface device 1120 may include an input unit to receive, from the user, an input of controlling an operation of the electronic apparatus 10 and an output unit to display a result according to an operation of the electronic apparatus 10 or information regarding a state of the electronic apparatus 10. For example, the user interface device 1120 may include a manipulation panel to receive a user input, a display panel to display a screen, etc.

As an example, the input unit may include a device such as a keyboard, a physical button, a touch screen, a camera, a microphone, or the like, which may receive various types of user inputs. Also, the output unit may include, for example, a display panel or a speaker. However, examples are not limited thereto, and the user interface device 1120 may include a device that supports various inputs and outputs.

The memory 1130 may store machine readable instructions or a program. For example, the memory 1130 may distinguish a writer based on handwritten text information that is read from an image of a scanned document including the handwritten text and store instructions regarding an operation method of the electronic apparatus 10 for generating a file regarding the document, based on setting information of the handwritten text and the distinguished writer.

The memory 1130 may include at least one of a flash memory type memory, a hard disk type memory, a multimedia card micro type memory, a card type memory (e.g., SD or XD memory), Random Access Memory (RAM), Static Random Access Memory (SRAM), Read-Only Memory (ROM), Electrically Erasable Programmable Read-Only Memory (EEPROM), Programmable Read-Only Memory (PROM), a magnetic memory, a magnetic disk, or an optical disk.

The processor 1140 may control an operation of the electronic apparatus 10 and may include at least one processor such as a Central Processing Unit (CPU). The processor 1140 may include at least one processor for each function or one integrated processor.

The processor 1140 may execute a program stored in the memory 1130, read data or a file stored in the memory 1130, or store new data or file in the memory 1130. The processor 1140 may execute an instruction stored in the memory 1130 to perform any of the above-described operations.

The processor 1140 may obtain an image regarding the document including the handwritten text. For example, the processor 1140 may receive an image from the external apparatus through the communication device 1110. Also, the processor 1140 may obtain an image by photographing the document including the handwritten text by using the camera in the electronic apparatus 10.

The processor 1140 may distinguish the writer writing the handwritten text, based on the feature information of the handwritten text that is read from the image.

For example, the processor 1140 may obtain the feature information of the handwritten text, based on at least one of a height, a width, a gradient, a curve, or a stroke shape of the handwritten text.

For example, the processor 1140 may distinguish the writer writing the handwritten text, according to a result of comparing the feature information of the handwritten text with the reference feature information of the handwritten text. For example, in a case where the feature information of the handwritten text matches two or more pieces of the reference feature information of the handwritten text, the processor 1140 may distinguish that at least two writers write the handwritten text.

For example, in a case where the reference feature information of the handwritten text is mapped to the writer and stored, the processor 1140 may distinguish the writer writing the handwritten text according to the result of comparing the feature information of the handwritten text with the reference feature information of the handwritten text of the writers.

For example, the processor 1140 may transmit the feature information of the handwritten text to the server 20 through the communication device 1110. The electronic apparatus 10 may receive information of the writer writing the handwritten text, who is identified based on the feature information of the handwritten text, from the server 20 through the communication device 1110.

In a case where the feature information of the handwritten text does not match the reference feature information of the handwritten text of the writers, the processor 1140 may map the feature information of the handwritten text to the information of the writer and may register the writer in the database.

The processor 1140 may generate the file regarding the document based on at least one of the setting information of the writer or the setting information of the handwritten text.

For example, the processor 1140 may obtain an area of the handwritten text based on the result of reading the image. The processor 1140 may generate the first file, from which the handwritten text may be retrieved, based on the area of the handwritten text and the storage type of the file.

For example, the processor 1140 may receive an input of setting style information to be applied to the handwritten text. The processor 1140 may generate a second file including handwritten text having a changed style, based on the style information.

For example, the processor 1140 may obtain security level information of the writer. The processor 1140 may generate a third file by performing security processing on the information requiring the security in the document, based on the security level information of the writer.

For example, in a case where a user logging in to the electronic apparatus 10 matches the identified writer, the processor 1140 may allow a certain job on the document including the handwritten text. On the contrary, in a case where the user logging in to the electronic apparatus 10 does not match the identified writer, the processor 1140 may allow a preset job on the document including the handwritten text. Also, in a case where the user logging in to the electronic apparatus 10 does not match the identified writer, the processor 1140 may allow a preset job based on whether the information requiring the security is included in the document including the handwritten text. In this case, the processor 1140 may identify whether the user logging in to the electronic apparatus 10 is a user authorized for the preset job and may allow the preset job.

For example, the processor 1140 may generate a file under a file name for identifying the writer, based on the setting information of the writer.

For example, in a case where the writers are distinguished in the image, the processor 1140 may classify the document as a personal file of the writer based on the area of the handwritten text of the writer selected from among the writers. The processor 1140 may generate a personal file under the file name for distinguishing the selected writer, according to a classification result.

For example, the processor 1140 may detect the destination, to which the file is to be transmitted or stored, based on the history information of the writer. The processor 1140 may transmit or store the file to the determined destination.

Figure 12:
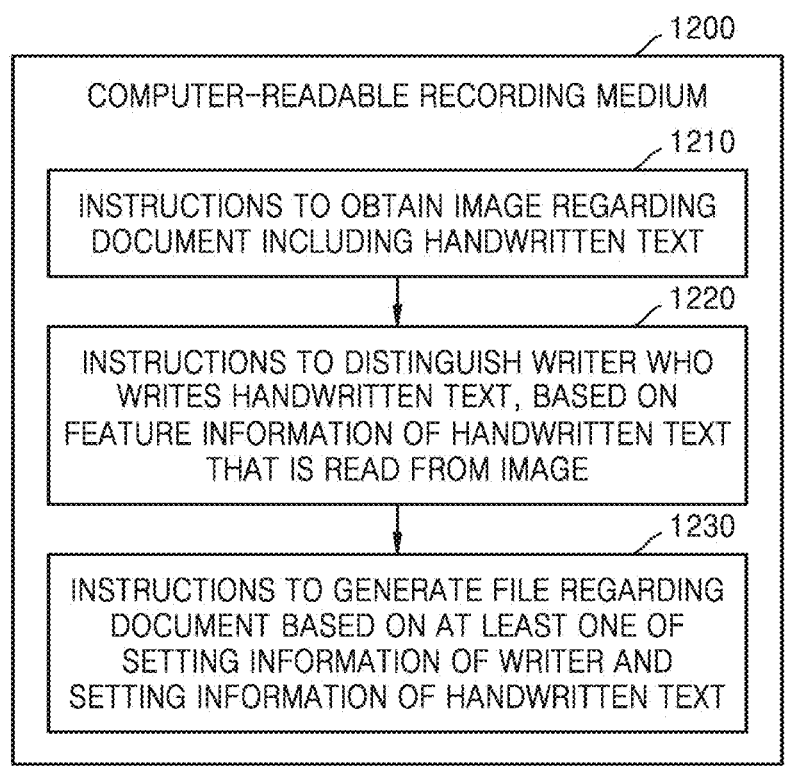
FIG. 12 is a diagram of instructions stored in a non-transitory computer-readable recording medium according to an example.

FIG. 12 is a diagram of instructions stored in a non-transitory computer-readable recording medium according to an example.

Referring to FIG. 12, a non-transitory computer-readable recording medium 1200 may include instructions to distinguish a writer based on handwritten text information that is read in the electronic apparatus 10 from an image of the scanned document including the handwritten text, and may include instructions regarding an operation method of the electronic apparatus 10 for generating the file regarding the document based on the distinguished writer or the setting information of the handwritten text. For example, the non-transitory computer-readable recording medium 1200 may store instructions 1210 for obtaining the image regarding the document including the handwritten text, instructions 1220 for distinguishing a writer writing the handwritten text based on the feature information of the handwritten text that is read from the image, and instructions 1230 for generating a file regarding a document based on at least one of the setting information of the writer or the setting information of the handwritten text.

An example operation method of the electronic apparatus 10 may be realized as a non-transitory computer-readable recording medium storing therein a command or data executable by a computer or a processor. The examples may be written as a program executable by a computer and implemented in a general-use digital computer that executes the program using the non-transitory computer-readable recording medium. Examples of the non-transitory computer-readable recording medium include ROM, RAM, flash memory, CD-ROMs, CD-Rs, CD+Rs, CD-RWs, CD+RWs, DVD-ROMs, DVD-Rs, DVD+Rs, DVD-RWs, DVD+RWs, DVD-RAMs, BD-ROMs, BD-Rs, BD-R LTHs, BD-REs, a magnetic tape, a floppy disk, a magnetic optical data storage device, an optical data storage device, a hard disk, solid state disk (SSD), etc. The non-transitory computer-readable recording medium may be any device that may store machine readable instructions, relevant data, data files, and data structures and provide a processor or a computer with the machine readable instructions, relevant data, data files, and data structures so that the processor or computer may execute the instructions.

Although various examples are described with reference to the drawings as above, various modifications and variations are possible from the above description. For example, an appropriate result may be achieved even though the described techniques may be performed in an order differently from the described method, and/or the described components such as systems, structures, devices, circuits, etc. may be combined in a different form from the described method, or other components or replaced or substituted with other components or equivalents.

It should be understood that examples described herein should be considered in a descriptive sense and not for purposes of limitation. Descriptions of features or aspects within each example should typically be considered as available for other similar features or aspects in other examples. While examples have been described with reference to the figures, it will be understood that various changes in form and details may be made therein without departing from the spirit and scope as defined by the following claims.

What is claimed is:

1. An electronic apparatus comprising:
a user interface device;
a communication device;
a processor; and
a memory to store instructions executable by the processor,
wherein the processor, by executing the instructions, is to:
obtain an image regarding a document comprising handwritten text,
distinguish a writer who writes the handwritten text based on feature information of the handwritten text that is read from the image, and
generate a file regarding the document based on at least one of setting information of the writer or setting information of the handwritten text.

2. The electronic apparatus of claim 1, wherein the processor, by executing the instructions, is to:
obtain the feature information of the handwritten text based on at least one of a height, a width, a gradient, a curve, or a stroke shape of the handwritten text, and
identify the writer who writes the handwritten text, according to a result of comparing the feature information of the handwritten text with reference feature information of handwritten text regarding a plurality of writers.

3. The electronic apparatus of claim 1, wherein the processor, by executing the instructions, is to:
transmit the feature information of the handwritten text to a server, and
receive, from the server, information of the writer who writes the handwritten text, wherein the writer is distinguished based on the feature information of the handwritten text.

4. The electronic apparatus of claim 1, wherein the processor, by executing the instructions, is to:
map the feature information of the handwritten text to the information of the writer, and register the writer in a database in a case where the feature information of the handwritten text does not match reference feature information of handwritten text regarding a plurality of writers.

5. The electronic apparatus of claim 1, wherein the processor, by executing the instructions, is to:
   obtain an area of the handwritten text according to a result of reading the image, and
   generate a first file, from which the handwritten text is searchable based on the area of the handwritten text and a storage type indicating a format of storing the file.

6. The electronic apparatus of claim 1, wherein the processor, by executing the instructions, is to:
   receive an input of setting style information applied to the handwritten text through the user interface device, and
   generate a second file comprising handwritten text having a changed style based on the style information.

7. The electronic apparatus of claim 1, wherein the processor, by executing the instructions, is to:
   obtain security level information of the writer, and
   generate a third file by performing security processing on information requiring security in the document according to a preset method based on the security level information of the writer.

8. The electronic apparatus of claim 1, wherein the processor, by executing the instructions, is to generate the file under a file name for distinguishing the writer based on setting information of the writer.

9. The electronic apparatus of claim 8, wherein the processor, by executing the instructions, is to:
   classify the document as a personal document of a writer selected from among a plurality of writers based on an area of the handwritten text of the selected writer, in a case where the plurality of writers are distinguished from the image, and
   generate a personal file under a file name for distinguishing the selected writer according to a classification result.

10. The electronic apparatus of claim 1, wherein the processor, by executing the instructions, is to:
    determine a destination to which the file is to be transmitted or stored based on history information of the writer, and
    transmit or store the file to the destination.

11. A non-transitory computer-readable recording medium storing therein instructions executable by a processor, the non-transitory computer-readable recording medium comprising:
    instructions to obtain an image regarding a document comprising handwritten text;
    instructions to distinguish a writer who writes the handwritten text based on feature information of the handwritten text that is read from the image; and
    instructions to generate a file regarding the document based on at least one of setting information of the writer and setting information of the handwritten text.

12. The computer-readable recording medium of claim 11, wherein the instructions to generate the file comprise:
    instructions to obtain an area of the handwritten text based on a result of reading the image; and
    instructions to generate a first file, from which the handwritten text is searchable based on the area of the handwritten text and a storage type indicating a format of storing the file.

13. The computer-readable recording medium of claim 11, wherein the instructions to generate the file comprise:
    instructions to receive an input of setting style information applied to the handwritten text; and
    instructions to generate a second file comprising handwritten text having a changed style based on the style information.

14. The computer-readable recording medium of claim 11, wherein the instructions to generate the file comprise:
    instructions to obtain security level information of the writer; and
    instructions to generate a third file by performing security processing on information requiring security in the document according to a preset method based on the security level information of the writer.

15. An operation method of an electronic apparatus, the operation method comprising:
    obtaining an image regarding a document comprising handwritten text;
    distinguishing a writer who writes the handwritten text based on feature information of the handwritten text that is read from the image; and
    generating a file regarding the document based on at least one of setting information of the writer and setting information of the handwritten text.

* * * * *